US011507896B2

(12) United States Patent
Tan et al.

(10) Patent No.: US 11,507,896 B2
(45) Date of Patent: Nov. 22, 2022

(54) METHOD AND SYSTEM FOR SPATIAL-TEMPORAL CARPOOL DUAL-PRICING IN RIDESHARING

(71) Applicant: Beijing DiDi Infinity Technology and Development Co., Ltd., Beijing (CN)

(72) Inventors: Bo Tan, Sunnyvale, CA (US); Yanyi He, Sunnyvale, CA (US)

(73) Assignee: Beijing DiDi Infinity Technology and Development Co., Ltd., Beijing (CN)

(*) Notice: Subject to any disclaimer, the term of this patent is extended or adjusted under 35 U.S.C. 154(b) by 68 days.

(21) Appl. No.: 17/061,330

(22) Filed: Oct. 1, 2020

(65) Prior Publication Data
US 2022/0108339 A1    Apr. 7, 2022

(51) Int. Cl.
G06Q 10/02    (2012.01)
G06N 7/00    (2006.01)
G06Q 30/02    (2012.01)
G06Q 10/06    (2012.01)
G06Q 50/30    (2012.01)
(Continued)

(52) U.S. Cl.
CPC ............ *G06Q 10/02* (2013.01); *G06N 7/005* (2013.01); *G06N 20/00* (2019.01); *G06Q 10/04* (2013.01); *G06Q 10/06393* (2013.01); *G06Q 30/0206* (2013.01); *G06Q 30/0284* (2013.01); *G06Q 30/08* (2013.01); *G06Q 50/30* (2013.01)

(58) Field of Classification Search
CPC combination set(s) only.
See application file for complete search history.

(56) References Cited

U.S. PATENT DOCUMENTS 10,628,771 B1    4/2020   Sicilia et al.
2001/0051932 A1  12/2001  Srinivasan et al.
(Continued)

FOREIGN PATENT DOCUMENTS

CN        110245976 A    9/2019
CN        110447050 A   11/2019
KR    10-2021-0004099 A    1/2021

OTHER PUBLICATIONS

Non-Final Office Action dated Jun. 14, 2022, issued in related U.S. Appl. No. 17/061,482 (31 pages).
(Continued)

*Primary Examiner* — Arif Ullah
(74) *Attorney, Agent, or Firm* — Sheppard Mullin Richter & Hampton LLP

(57) ABSTRACT

Methods, systems, and apparatus, including computer programs encoded on computer storage media for carpool dual-pricing in ridesharing are provided. An exemplary method comprises: obtaining a machine-learning model trained to generate a probability for a carpool request from a rider to convert to a trip based at least on a pair of price adjustment multipliers applied to the carpool request; determining one or more Key Performance Indicator (KPI) models based on the machine-learning model; constructing an optimization model based on the KPI models, the optimization model comprising a plurality of pairs of price adjustment multipliers as decision variables; and determining optimal values of the plurality of pairs of price adjustment multipliers for the plurality of pricing units by solving the optimization model based on a plurality of historical carpool requests.

17 Claims, 6 Drawing Sheets

(51) Int. Cl.
*G06N 20/00* (2019.01)
*G06Q 10/04* (2012.01)
*G06Q 30/08* (2012.01)

(56) References Cited

U.S. PATENT DOCUMENTS

| | | | |
|---|---|---|---|
| 2006/0069601 A1* | 3/2006 | Simon | G06Q 10/06314 |
| | | | 705/7.13 |
| 2012/0254092 A1 | 10/2012 | Malov et al. | |
| 2013/0246207 A1* | 9/2013 | Novak | G06Q 30/0641 |
| | | | 705/26.2 |
| 2016/0148233 A1 | 5/2016 | Dangaltchev et al. | |
| 2018/0157984 A1 | 6/2018 | O'Herlihy et al. | |
| 2019/0236742 A1* | 8/2019 | Tomskii | G06Q 30/0611 |
| 2019/0392390 A1 | 12/2019 | Xu | |
| 2020/0013135 A1* | 1/2020 | Kodesh | G06Q 50/30 |
| 2020/0111015 A1 | 4/2020 | Liu et al. | |
| 2020/0175632 A1* | 6/2020 | Vora | G06Q 10/063114 |
| 2021/0142229 A1* | 5/2021 | Young | G01C 21/3438 |
| 2021/0192584 A1* | 6/2021 | Spielman | G06Q 30/0284 |
| 2021/0192585 A1 | 6/2021 | Gulati et al. | |
| 2021/0374627 A1 | 12/2021 | Mueller et al. | |

OTHER PUBLICATIONS

Sidath Asiri, Machine Learning Classifiers I What is classification?, Towards Data Science, Jun. 11, 2018, https://towardsdatascience.com/machine-learning-classifiers-a5cc4e1b0623 (accessed Jun. 1, 2022) (Year: 2018).

* cited by examiner

500

510 — obtaining a machine-learning model trained to generate a probability for a carpool request from a rider to convert to a trip based at least on a pair of price adjustment multipliers applied to the carpool request, wherein the pair of price adjustment multipliers correspond to a pricing unit to which the carpool request belongs 520 — determining one or more Key Performance Indicator (KPI) models based on the machine-learning model, wherein each of the KPI models comprises a plurality of pairs of price adjustment multipliers as parameters corresponding to a plurality of pricing units 530 — constructing an optimization model based on the KPI models, wherein the optimization model comprises the plurality of pairs of price adjustment multipliers as decision variables 540 — determining optimal values of the plurality of pairs of price adjustment multipliers for the plurality of pricing units by solving the optimization model based on a plurality of historical carpool requests

FIG. 5

METHOD AND SYSTEM FOR SPATIAL-TEMPORAL CARPOOL DUAL-PRICING IN RIDESHARING

TECHNICAL FIELD

The disclosure relates generally to systems and methods for ridesharing, in particular, determining dual-price for carpool in ridesharing.

BACKGROUND

A ridesharing platform matches drivers of personal cars or taxis with riders to provide on-demand transportation services. When a rider opens the mobile app (or website) associated with the platform and fills information like origin, destination, and departure time (if not departing immediately), the app may show several trip options (e.g., a solo trip or carpool) between the specified origin and destination for the rider to choose. Additionally, price and other information (e.g., estimated travel time and arrival time) may be shown. If a rider chooses one of the options, the platform may try to match the rider's choice with nearby drivers and send the request to the matched driver. If the matched driver accepts the request, the driver may then pick up the rider, take the rider to the destination and drop off the rider.

One of the essential components of a ridesharing platform is pricing. Currently, for both solo trips and carpool trips, the ridesharing platform determines prices as "upfront" prices, which factor in estimated travel time and distance, supply/demand balance (e.g., as surge multipliers) and various surcharges and fees. Because carpools save the cost of paying drivers for moving the same amount of demands/riders, the ridesharing platform usually applies upfront discounts to carpool trips as incentives for the riders to select carpool services. However, the "upfront" pricing strategies become inefficient when a carpool trip fails to get matched, in which case the anticipated savings to the ridesharing platform are not realized and thus the applied discount becomes unnecessary. As a result, a more intelligent pricing method for carpools in ridesharing is proposed.

SUMMARY

Various embodiments of the specification include, but are not limited to, systems, methods, and non-transitory computer readable media for carpool dual-pricing in ridesharing.

In various implementations, a first exemplary method for carpool dual-pricing may include: obtaining a machine-learning model trained to generate a probability for a carpool request from a rider to convert to a trip based at least on a pair of price adjustment multipliers applied to the carpool request, the pair of price adjustment multipliers corresponding to a pricing unit to which the carpool request belongs; determining one or more Key Performance Indicator (KPI) models based on the machine-learning model, each of the KPI models comprising a plurality of pairs of price adjustment multipliers as parameters corresponding to a plurality of pricing units; constructing an optimization model based on the KPI models, wherein the optimization model comprises the plurality of pairs of price adjustment multipliers as decision variables; and determining optimal values of the plurality of pairs of price adjustment multipliers for the plurality of pricing units by solving the optimization model based on a plurality of historical carpool requests.

In some embodiments, the first exemplary method may further comprise determining, based on a plurality of features of a carpool request, a pricing unit to which the carpool request belongs; and determining, based on the optimal values of the pair of price adjustment multipliers corresponding to the determined pricing unit, a carpool-matched price and a carpool-not-matched price for the carpool request, where the carpool-matched price is applied to the carpool request when the carpool request is matched with another carpool request, and the carpool-not-matched price is applied to the carpool request when the carpool request fails to be matched.

In some embodiments, the machine-learning model is trained to generate the probability for the carpool request to convert to the trip based further on: a rider-expected carpool matching probability of the rider's carpool request, wherein the rider-expected carpool matching probability is determined based on historical carpool requests of the rider.

In some embodiments, the first exemplary method may further comprise training the machine-learning model by: obtaining training data from a plurality of historical carpool requests from a plurality of pricing units, wherein the training data comprises, for each historical carpool request, a pair of historical price adjustment multipliers applied to the historical carpool request, a rider-expected carpool matching probability of the historical carpool request, and a label indicating whether the historical carpool request was converted to a historical trip; and training a machine-learning classifier based on the training data to receive input comprising a pair of price adjustment multipliers applied to a given carpool request of a given rider and the rider-expected carpool matching probability of the given rider, and generate output comprising a probability for the given carpool request to convert to a trip.

In some embodiments, the historical carpool request further comprises at least one of: spatial and temporal features of the historical carpool request; estimated trip-related attributes of the historical carpool request; or rider features extracted from a rider of the historical carpool request.

In some embodiments, one or more of the plurality of historical carpool requests each comprises a pair of randomly assigned price adjustment multipliers In some embodiments, the one or more KPI models comprise at least one of: a trip conversion rate model, a gross profit model, or a gross merchandise value model.

In some embodiments, the machine-learning model is one of: Logistic Regression model, Random Forest (RF) model, or Deep Neural Network (DNN) model.

In some embodiments, the determining the one or more KPI models based on the machine-learning model comprises: training a carpool matching probability prediction model that predicts a carpool matching probability for a carpool request based on the machine-learning model, a plurality of features of the carpool request, and a total count of trips in the pricing unit to which the carpool request belongs; and determining the one or more KPI models based on the machine learning model and the carpool matching probability prediction model.

In some embodiments, the optimization model further comprises: one or more boundary constraints of the plurality of pairs of price adjustment multipliers.

In some embodiments, the pair of price adjustment multipliers comprises a first multiplier determining a carpool-matched price and a second multiplier determining a carpool-not-matched price, wherein the first multiplier is less than the second multiplier.

According to another aspect, a second exemplary method for determining optimal carpool dual-pricing multipliers may comprise: obtaining a first machine-learning model trained to predict a probability for a given carpool request to convert to a trip; receiving a plurality of carpool requests in a pricing unit, wherein the pricing unit corresponds to a pair of price adjustment multipliers for determining prices for carpool requests in the pricing unit; determining an expected trip count by the first machine-learning model based on the plurality of carpool requests in the pricing unit and the pair of price adjustment multipliers; for each of the plurality of carpool requests, generating a carpool matching probability of the carpool request by a second machine learning model based on the first expected trip count, wherein the second machine learning model is trained based on a plurality of historical carpool requests to predict a probability for a carpool request to get matched; constructing one or more Key Performance Indicator (KPI) models based on the plurality of carpool matching probabilities and the pair of price adjustment multipliers; and determining optimal values of the pair of price adjustment multipliers for the pricing unit based on an optimization model maximizing an aggregated value of the one or more KPI models.

In some embodiments, the second exemplary method may further comprise training the first machine-learning model by: obtaining training data from a plurality of historical carpool requests from a plurality of pricing units, wherein the training data comprises, for each historical carpool request, a pair of historical price adjustment multipliers applied to the historical carpool request, a rider-expected carpool matching probability of the historical carpool request, and a label indicating whether the historical carpool request was converted to a historical trip; and training a machine-learning classifier based on the training data to receive input comprising a pair of price adjustment multipliers applied to a given carpool request of a given rider and the rider-expected carpool matching probability of the given rider, and generate output comprising a probability for the given carpool request to convert to a trip.

In some embodiments, the rider-expected carpool matching probability of the historical carpool request is determined based on historical carpool requests of a rider of the historical carpool request.

In some embodiments, the pair of price adjustment multipliers comprises a carpool-matched price adjustment multiplier and a carpool-unmatched price adjustment multiplier, the carpool-matched price adjustment multiplier is applicable to a given carpool request for determining a carpool-matched price, and the carpool-unmatched price adjustment multiplier is applicable to the given carpool request for determining a carpool-unmatched price, wherein the carpool-matched price is enforced when the given carpool request is matched with another carpool request, and the carpool-unmatched price is applied when the given carpool request fails to be matched.

In some embodiments, the constructing one or more KPI models based on the plurality of carpool matching probabilities and the pair of price adjustment multipliers comprises: obtaining an original price for each of the carpool requests based on at least one of estimated travel time and estimated travel distance; determining an expected price adjustment multiplier based on the pair of price adjustment multipliers, the carpool matching probability, and a complement of the carpool matching probability; determining the expected value of the carpool request based on the original price and the expected price adjustment multiplier; and constructing one KPI model based on a plurality of the expected values of the plurality of carpool requests.

In some embodiments, the determining the expected trip count by applying the first machine-learning model to the plurality of carpool requests in the pricing unit comprises: for each of the plurality of carpool requests in the pricing unit, determining the probability for the carpool request to convert to a trip; and determining the first expected trip count based on a total number of the plurality of carpool requests and the probabilities.

In some embodiments, the second exemplary method may further comprise: identifying a second pricing unit that is spatially and temporally adjacent to the pricing unit of the carpool request; determining a second expected trip count by applying the first machine-learning model to a plurality of carpool requests in the second pricing unit; wherein the generating the carpool matching probability of the carpool request further comprises: generating the carpool matching probability of the carpool request based on the first expected trip count, the second expected trip count, and the second machine learning model.

In some embodiments, the second exemplary method may further comprise: training the second machine learning model based on the plurality of historical carpool requests from a plurality of pricing units, wherein the training comprises, for each of the plurality of historical carpool requests: identifying a third pricing unit to which the historical carpool request belongs; obtaining a third trip count in the third pricing unit during a historical period of time; obtaining one or more trip counts in one or more different pricing units that are spatially and temporally adjacent to the third pricing unit; extracting a plurality of features of the historical carpool request; inputting the third trip count, the one or more trip counts, and the plurality of features into the second machine learning model to predict a carpool matching probability; and adjusting one or more parameters of the second machine learning model based on the predicted carpool matching probability and a label of the historical carpool request indicating whether the historical carpool request was actually matched.

In some embodiments, the generating the carpool matching probability of the carpool request is further based on a plurality of features of the carpool request, wherein the plurality of features comprises at least one of: spatial features of the carpool request; temporal features of the carpool request; point of interest associated with the carpool request; estimated trip duration; or estimated trip distance.

In some embodiments, the optimization model comprises the pair of price adjustment multipliers as decision variables, and an objective function as a weighted sum of the one or more KPI models.

According to other embodiments, a computing system may comprise one or more processors and one or more non-transitory computer-readable memories coupled to the one or more processors and configured with instructions executable by the one or more processors. Executing the instructions may cause the system to perform any of the exemplary methods of any of the preceding embodiments.

According to yet other embodiments, a non-transitory computer-readable storage medium is configured with instructions executable by one or more processors to cause the one or more processors to perform any of the exemplary methods of any of the preceding embodiments.

These and other features of the systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which:

FIG. 5 illustrates a method for carpool dual-pricing in ridesharing, in accordance with various embodiments.

DETAILED DESCRIPTION OF THE EMBODIMENTS

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope, and contemplation of the present invention as further defined in the appended claims.

The present disclosure describes a carpool dual-pricing in ridesharing, where a carpool trip or a carpool request may be charged a first discounted price if it is matched with a co-rider (alternatively referred to another carpool request), or a second discounted price if it is not matched with another co-rider. In this context, the "discounted price" may refer to a price lower than the price charged against an "original price" determined by the ridesharing platform based on estimated trip distance and/or estimated trip duration of the trip (e.g., the estimated price for a solo trip of the same configurations as the carpool trip or request). In some embodiments, the dual-prices for carpools are determined in a spatial-temporal pricing framework and based on an optimization problem (also referred to as optimization model), which allows ridesharing platforms to achieve optimal Key Performance Indicators (KPI) by exploiting the diversity across spatial-temporal units.

For simplicity, the term "ridesharing platform" in this present disclosure refers to service providers offering ride-hailing services, (e.g., a rider "hails" or hires a driver for transportation without sharing with other riders), ride-sharing services (e.g., a rider sharing a vehicle with other riders), and other suitable services that involve pooling. The term "vehicle" may include cars, airplanes, boats, bikes, or any other form of transportation tools. The term "passenger" and "rider" may be used interchangeably.

Figure 1:
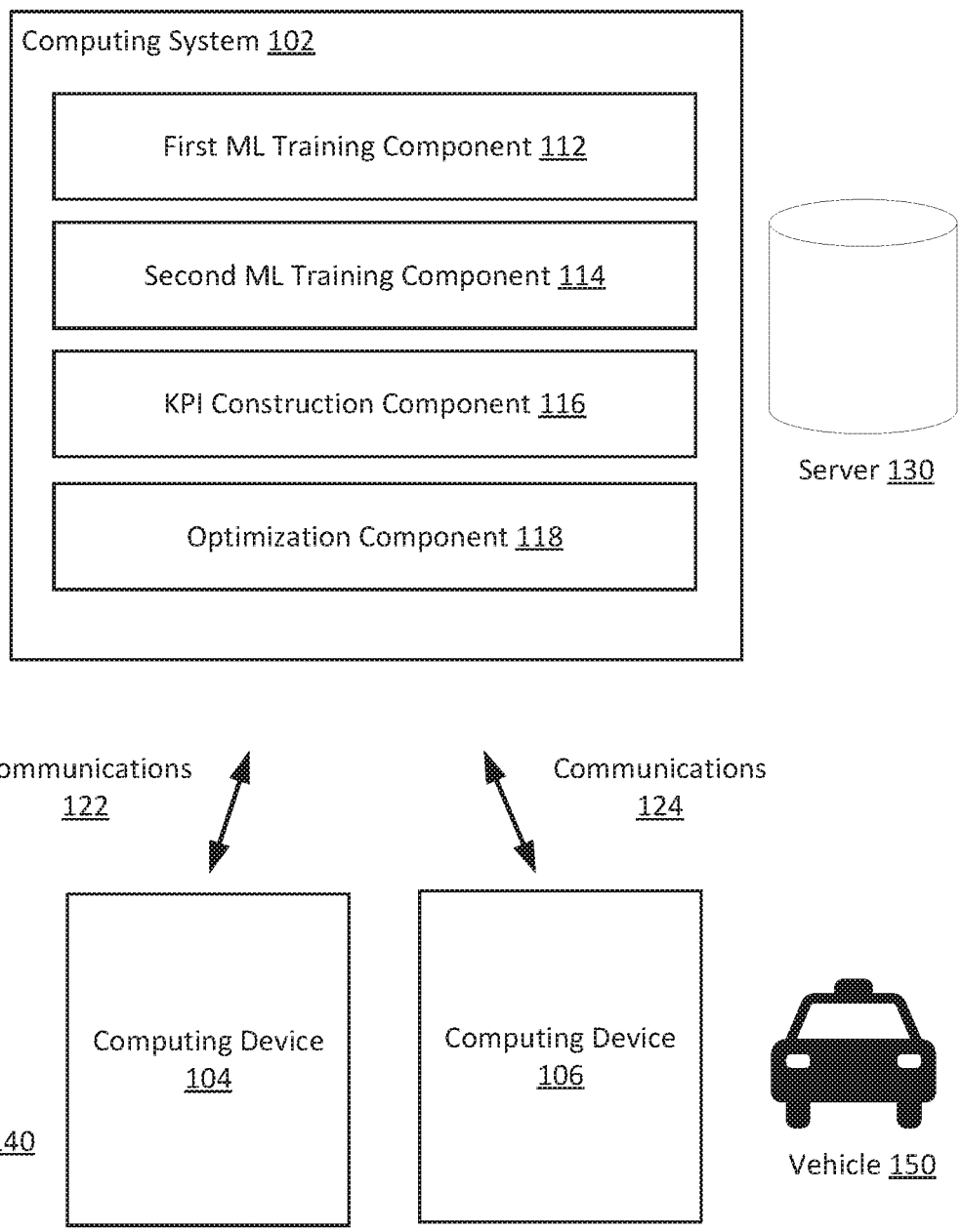
FIG. 1 illustrates an exemplary system to which techniques for carpool dual-pricing in ridesharing may be applied, in accordance with various embodiments.

FIG. 1 illustrates an exemplary system to which techniques for carpool dual-pricing in ridesharing may be applied, in accordance with various embodiments. The example system 100 may include a computing system 102, a computing device 104, and a computing device 106. It is to be understood that although two computing devices are shown in FIG. 1, any number of computing devices may be included in the system 100. Computing system 102 may be implemented in one or more networks (e.g., enterprise networks), one or more endpoints, one or more servers (e.g., server 130), or one or more clouds. The server 130 may include hardware or software which manages access to a centralized resource or service in a network. A cloud may include a cluster of servers and other devices that are distributed across a network.

The computing devices 104 and 106 may be implemented on or as various devices such as a mobile phone, tablet, server, desktop computer, laptop computer, etc. The computing devices 104 and 106 may each be associated with one or more vehicles (e.g., car, truck, boat, train, autonomous vehicle, electric scooter, electric bike, etc.). The computing devices 104 and 106 may each be implemented as an in-vehicle computer or as a mobile phone used in association with the one or more vehicles. The computing system 102 may communicate with the computing devices 104 and 106, and other computing devices. Computing devices 104 and 106 may communicate with each other through computing system 102, and may communicate with each other directly. Communication between devices may occur over the internet, through a local network (e.g., LAN), or through direct communication (e.g., BLUETOOTH™, radio frequency, infrared).

In some embodiments, the system 100 may include a ridesharing platform. The ridesharing platform may facilitate transportation service by connecting drivers of vehicles with passengers. The platform may accept requests for transportation from passengers, identify idle vehicles 150 to fulfill the requests through communications 124, arrange for pick-ups, and process transactions. For example, passenger 140 may use the computing device 104 to request a trip. The trip request may be included in communications 122. The computing device 104 may be installed with a software application, a web application, an API, or another suitable interface associated with the ridesharing platform.

In some embodiments, the computing system 102 may include a first machine learning model training component 112, a second machine learning model training component 114, a KPI model construction component 116, and an optimization component 118. Depending on the implementation, the computing system 102 may include more, fewer, or alternative components. The computing system 102 may include one or more processors (e.g., a digital processor, an analog processor, a digital circuit designed to process information, a central processing unit, a graphics processing unit, a microcontroller or microprocessor, an analog circuit designed to process information, a state machine, and/or other mechanisms for electronically processing information) and one or more memories (e.g., permanent memory, temporary memory, non-transitory computer-readable storage medium). The one or more memories may be configured with instructions executable by the one or more processors. The processor(s) may be configured to perform various operations by interpreting machine-readable instructions stored in the memory. The computing system 102 may be installed with appropriate software (e.g., platform program, etc.) and/or hardware (e.g., wires, wireless connections, etc.) to access other devices of the system 100.

In some embodiments, the first machine learning model training component 112 may be configured to train or obtain a first machine learning model to generate a probability of a rider's carpool request converting to a trip based at least on a pair of price adjustment multipliers applied to the carpool request. In some embodiments, the pair of price adjustment multipliers is applied to a pricing unit to which the carpool request belongs. For example, a ridesharing platform may partition the spatial and/or temporal dimensions into a plurality of spatial-temporal pricing units, and apply a pair of price adjustment multipliers to each of the plurality of pricing units for determining dual-prices for carpools therein. In some embodiments, the pair of price adjustment multipliers comprises a carpool-matched price adjustment multiplier and a carpool-unmatched price adjustment multiplier, the carpool-matched price adjustment multiplier is applicable to a given carpool request for determining a carpool-matched price, and the carpool-unmatched price adjustment multiplier is applicable to the given carpool request for determining a carpool-unmatched price. In some embodiments, the two price adjustment multipliers may refer to two different discount rates, and the first price adjustment multiplier may be configured to be less (e.g., generating a higher discount) than the second price adjustment multiplier.

In some embodiments, the probability for the rider's carpool request to convert to a trip may further depend on other factors, such as a rider-expected carpool matching probability. For example, a rider who has most of his/her historical carpool requests matched may have a higher rider-expected carpool matching probability than another rider who rarely gets matched. For example, a rider with a higher rider-expected carpool matching probability may be more confident about matching and thus may be more willing to wait longer for the trip to get matched. For this reason, the rider-expected carpool matching probability may also be referred to as a subjective (e.g., from the rider's point of view) carpool matching probability in the following description.

In some embodiments, the first machine learning model may be trained by the computing system 102 or obtained from a different computing system. An exemplary training process may start with obtaining training data from a plurality of historical carpool requests from a plurality of pricing units. In some embodiments, the training data comprises, for each historical carpool request, a pair of historical price adjustment multipliers applied to the historical carpool request, a rider-expected carpool matching probability of the historical carpool request, and a label indicating whether the historical carpool request was converted to a historical trip. With the training data, the training process may further include training a machine-learning classifier based on the training data to receive input comprising a pair of price adjustment multipliers applied to a given carpool request of a given rider and the rider-expected carpool matching probability of the given rider, and generate output comprising a probability for the given carpool request to convert to a trip.

In some embodiments, for each of the plurality of historical carpool requests, the first machine learning model may further consider one or more of the following features as input: spatial and temporal features of the historical carpool request; estimated trip-related attributes of the historical carpool request; and rider features extracted from a rider of the historical carpool request. During the training process, based on the input features, the first machine learning model may predict a probability for the historical carpool request to convert to a trip. According to the difference/distance between the predicted probability and the actual history (e.g., in a form of label indicating whether the request was converted to a trip), parameters of the first machine learning model may be adjusted to improve the accuracy of predictions.

In some embodiments, the second machine learning model training component 114 may be configured to train or obtain a second machine learning model to predict carpool matching probabilities for carpool requests. These predicted carpool matching probabilities may be distinguishable from the above-mentioned rider-expected carpool matching probabilities. A rider-expected carpool matching probability may be derived from individual rider's historical trips and thus from the individual rider's perspective, which may affect his/her decision (e.g., patience) to wait for a carpool request to be matched, or even his/her decision to make a request to the carpool product based on the matched and unmatched prices. A carpool matching probability predicted by the second machine learning model may be obtained based on an analysis/learning of the current supply and demand status, trip features, rider features, or other factors from the perspective of the ridesharing platform. In other words, the rider-expected carpool matching probability may be considered "subjective," while the carpool matching probability predicted by the second machine learning model may be considered "objective."

In some embodiments, the second machine learning model may be trained by the computing system 102 or obtained from another computing system. In some embodiments, the second machine-learning model may be trained based on a plurality of historical carpool requests from a plurality of pricing units. In some embodiments, the training comprises, for each of the plurality of historical carpool requests: identifying a pricing unit to which the historical carpool request belongs; obtaining a trip count in the pricing unit during a historical period of time; obtaining one or more trip counts in one or more different pricing units that are spatially and temporally adjacent to the afore-mentioned pricing unit; extracting a plurality of features of the historical carpool request; inputting all the trip counts, the one or more trip counts, and the plurality of features into the second machine learning model to predict a carpool matching probability; and adjusting one or more parameters of the second machine learning model based on the predicted carpool matching probability and a label of the historical carpool request indicating whether the historical carpool request was actually matched.

For example, assuming one historical carpool request belongs to a spatial-temporal pricing unit (e.g., zip code 12345 between 10:00 AM and 10:02 AM), the total trip count in the spatial-temporal pricing unit may be obtained by searching the historical data. The higher number of trips at the same location and same time (e.g., may refer to a region or an origin-destination region pair, and a period of time), the higher chance that the historical carpool request may be matched. Considering that the historical carpool request may also be matched by other carpool requests in the nearby spatial-temporal pricing units during the trip, the trip counts in the nearby spatial-temporal pricing units may also be linked to the carpool matching probability of the historical carpool request. For example, the trips in the adjacent zip code to which the rider was heading towards and in the next time window (e.g., 5 minutes later) may provide additional carpool candidates for the carpool request. In some embodiments, by inputting the trip counts and the plurality of trip features of a historical carpool trip, the second machine learning model may generate a predicted carpool matching probability. Based on the difference or distance between the predicted carpool matching probability and the label of the historical carpool trip, the parameters of the second machine learning model may be adjusted so that the accuracy of the generated predictions may be improved.

During the training process, these trip counts in the relevant pricing units may be learned from the historical carpool requests based on searching and grouping. Since the historical data includes all the trips that have occurred in the past, the trip counts learned from the historical data may be understood as the exact numbers. However, when applying the trained second machine learning model to predict a carpool matching probability for a carpool request, it may be difficult to obtain the exact trip counts in the one or more pricing units related to the carpool request. The reason may be obvious: the trips have not occurred yet. For example, the adjacent pricing unit may be in the near future (e.g., temporal dimension) and thus the exact trip count may only be predicted but not observed. In some embodiments, the trip counts of the relevant pricing units may be predicted based on the trained first matching learning model (e.g., the trip conversion model) and the total numbers of trip requests in the one or more pricing units. For example, for a carpool request in a pricing unit, the second machine learning model may be used to determine an expected price for the carpool request by: determining an expected trip count by the first machine-learning model based on a plurality of carpool requests (e.g., features of the requests) in the pricing unit and the pair of price adjustment multipliers for carpool dual-pricing; generating a carpool matching probability of the carpool request based on the first expected trip count and the trained second machine learning model.

In some embodiments, the KPI model construction component 116 may be configured to construct one or more KPI models based on the first machine learning model, the second machine learning model, other suitable factors, or any combination thereof. Exemplary KPI models may include a trip conversion rate model, a gross profit model, a gross merchandise value (GMV) model, or another suitable model. Each of the KPI models may include a plurality of pairs of price adjustment multipliers as factors (arguments) to determine the corresponding KPI values that may be generated by a plurality of historical trips. In some embodiments, the plurality of pairs of price adjustment multipliers in each of the KPI models respectively correspond to a plurality of pricing units.

In some embodiments, the optimization component 118 may be configured to construct an optimization problem (also referred to optimization model) based on the one or more KPI models constructed by the KPI model construction component 116. In some embodiments, the plurality of pairs of price adjustment multipliers of the plurality of pricing units in the one or more KPI models may be treated as decision variables in the optimization problem. Therefore, solving the optimization problem may determine the optimal values of the plurality of pairs of price adjustment multipliers, which may be deployed in a ridesharing platform for determining carpool dual-prices in the plurality of pricing units. In some embodiments, the optimization problem may be subject to a plurality of constraints, such as boundary constraints of the plurality of pairs of price adjustment multipliers. For example, each multiplier must be less than 1 (thus when applying to an original price, it provides a discount), or be between a platform-determined range (e.g., the discount rate cannot be more than 50%), or for each pricing unit, the multiplier applied to matched trips must be less (e.g., providing higher discounts) than the multiplier applied to the unmatched trips.

Figure 2:
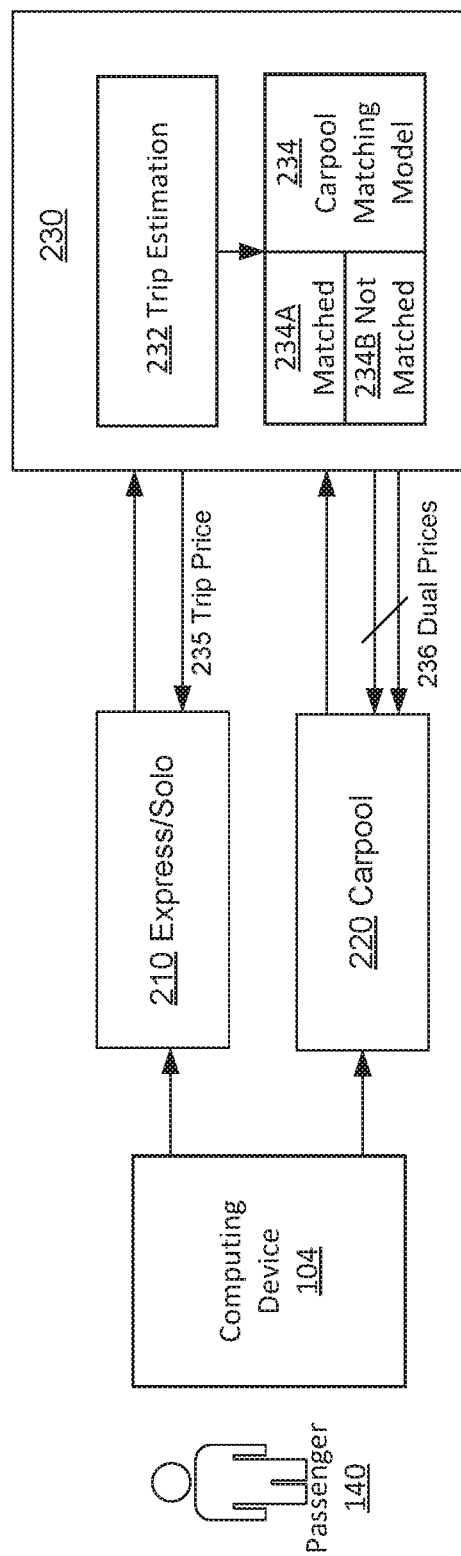
FIG. 2 illustrates an exemplary diagram of carpool dual-pricing in ridesharing, in accordance with various embodiments.

FIG. 2 illustrates an exemplary diagram of carpool dual-pricing in ridesharing, in accordance with various embodiments. As described above, a rider (also called passenger) 140 may request for a transportation service through his or her computing device 104 on a ridesharing platform. In some embodiments, the rider 140 may have multiple options for configuring his or her trip request, such as express or solo trip 210 where the rider hires a driver for transportation without sharing with other riders, or a carpool 220 where the rider is open to sharing with other riders. In some embodiments, the trip request may be sent to a server 230 of the ridesharing platform for pricing. For an express or solo trip request 210, the server 230 may perform trip estimation 232 based on the spatial and temporal information related to the trip request to determine an estimated waiting time (e.g., including order dispatching time and/or pickup time), an estimated travel time, an estimated travel distance, another suitable estimation, or any combination thereof. These estimations may be the basis for the server 230 to determine an "original" price 235 for the express or solo trip request 210 and display such "original" price 235 as an "upfront" price to the rider 140. Acceptance of the "original" price 235 may convert the express or solo trip request 210 into an actual trip.

On the other hand, pricing a carpool request 220 may be more complicated than pricing the express or solo trip request 210 for various reasons. For example, the ridesharing platform may have the incentives to offer discounts to carpool requests since these trips would save costs for the platform. However, it may not be straightforward to determine the optimal discount rates considering the conflict of interests between the riders and the ridesharing platform. As another example, offering one single predetermined discounted price for a carpool request may be inefficient as there is a possibility that the carpool request may not get matched. As such, some embodiments in this present disclosure describe a dual-pricing strategy to offer dual-prices 236 for carpool requests 220. In some embodiments, the server 230 of the ridesharing platform may train a machine learning model 234 to predict the matching probability of a carpool request 220 being matched with another carpool request. Subsequently, the server 230 may determine two discounted prices 236 for the carpool request 220 based on the probability of the request being matched 234A and the probability of the request not being matched 234B. In some embodiments, the server 230 may determine two discount rates or price adjustment multipliers in order to generate the two discounted prices 236 based on the trip estimation 232. For example, the two price adjustment multipliers may be applied to an "original" price of the carpool request to generate the dual-prices 236, where the "original" price of the carpool request is determined by the server 230 through trip estimation 232 (e.g., based on estimated travel time, travel distance, waiting time, etc.).

Figure 3:
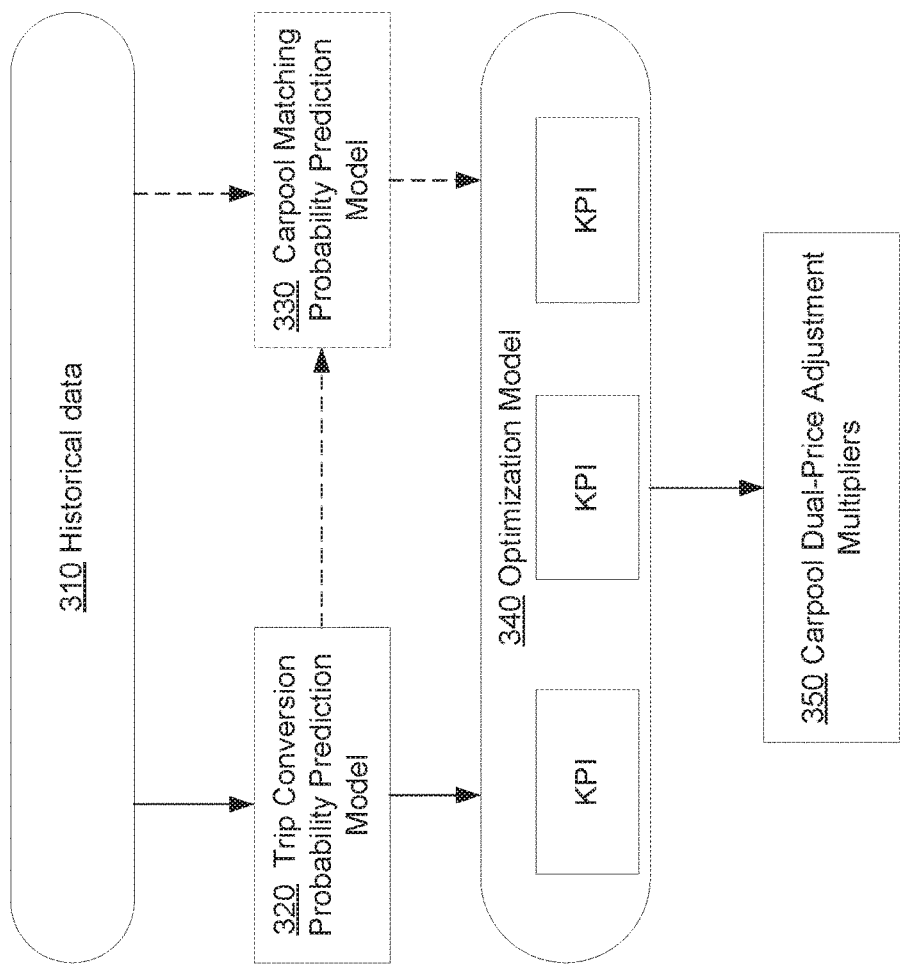
FIG. 3 illustrates an exemplary diagram for determining optimal carpool dual-pricing adjustment multipliers in ridesharing, in accordance with various embodiments.

FIG. 3 illustrates an exemplary diagram for determining optimal carpool dual-pricing adjustment multipliers in ridesharing, in accordance with various embodiments. As described above, a ridesharing platform may apply different pricing strategies for carpool requests in different regions and/or times. These pricing strategies may involve a plurality of price adjustment multipliers for carpool dual-pricing. For example, each pricing unit may have a corresponding pair of price adjustment multipliers, which includes a carpool-matched price adjustment multiplier and a carpool-unmatched price adjustment multiplier. The carpool-matched price adjustment multiplier is applicable to a given carpool request for determining a carpool-matched price, and the carpool-unmatched price adjustment multiplier is applicable to the given carpool request for determining a carpool-unmatched price. In some embodiments, these regions and/or times may be predetermined and referred to as spatial-temporal pricing units. Carpool requests within the same spatial-temporal pricing unit may be applied with the same pair of price adjustment multipliers for determining carpool dual-prices. For example, a pricing unit may be an OT unit ("O" refers to the origin of a trip, "T" refers to the time of the trip), or an ODT unit ("D" refers to the destination of the trip). The spatial-temporal pricing units may be determined by, for example, spatial-temporal clustering algorithms, empirical evidence, or rule-based methods.

In some embodiments, in order to determine the optimal carpool dual-pricing multipliers 350 (also called a pair of price adjustment multipliers applicable to carpool requests) for each of a plurality of pricing units, the ridesharing platform may construct an optimization problem 340 with the multipliers as decision variables. The objective function of the optimization problem 340 may include one or more KPI models, and solving the optimization problem 340 may determine optimal carpool dual-price multipliers 350 that maximize the value of the objective function. For example, an exemplary optimization problem 340 may be denoted as the following formula (1).

$$\max_{\vec{\alpha},\vec{\beta}} \sum_i w_i \vec{f}_i(\vec{\alpha}, \vec{\beta}) \quad (1)$$

where $\vec{\alpha}$ may refer to a vector of price adjustment multipliers applied when carpool requests are matched, $\vec{\beta}$ may refer to a vector of price adjustment multipliers when carpool requests do not get matched, $\vec{f}_i(\vec{\alpha}, \vec{\beta})$ may refer to the $i_{th}$ KPI model, and $w_i$ may refer to a weight assigned to the $i_{th}$ KPI model. In some embodiments, $\vec{\alpha}:=[\alpha_u]$ and $\vec{\beta}:=[\beta_u]$, where u may refer to an index or an identifier of one spatial-temporal pricing unit. For example, a pair of ($\alpha_i$, $\beta_i$) may represent the pair of price adjustment multipliers for carpool dual-pricing in the $i_{th}$ pricing unit.

In some embodiments, $\vec{f}_i(\vec{\alpha}, \vec{\beta})$ can be represented as: $\vec{f}_i(\vec{\alpha}, \vec{\beta}) = \sum_u f_{iu}(\alpha_u, \beta_u)$, where each $f_{iu}(\alpha_u, \beta_u)$ can be independently calculated. That is, $\vec{f}_i$ in each of the plurality of pricing units may be calculated in parallel. In some embodiments, historical trip data may be evaluated based on the KPI models included in the optimization problem 340. For example, $f_{iu}(\alpha_u, \beta_u)$ may be calculated by applying $\alpha_u$ and $\beta_u$ to each individual historical trip in the spatial-temporal pricing unit u, evaluating the corresponding KPI metric for that individual trip, and then determining the sum of all the individual trips. That is, $f_{iu}(\alpha_u, \beta_u) = \sum_{o \in u} f_i(\alpha_u, \beta_u, \vec{x}_o)$, where each order $o \in u$ means this trip order happens at the spatial-temporal pricing unit u, and $f_i(\alpha_u, \beta_u, \vec{x}_o)$ may denote the $i_{th}$ KPI metric at an individual carpool request level, where $\vec{x}_o$ may represent other carpool request features, like origin, destination, time, weather, traffic time, rider's information, etc.

In some embodiments, the decision variables $\{\vec{\alpha}, \vec{\beta}\}$ may be subjected to various constraints, such as boundary constraints. In a carpool context, the price multiplier for determining carpool price may be configured less than 1 (always offering discounts to carpool requests), and the discount for an unmatched carpool request may not be greater than the discount for a matched carpool request. That is, $0 < \alpha_u \leq \beta_u \leq 1$, $\forall u$. In some embodiments, there may be additional lower and/or upper bounds on these multipliers to restrict them from being over-adjusted. For example, these constraints may be represented as $$\alpha_u^{min} \leq \alpha_u \leq \alpha_u^{max}, \beta_u^{min} \leq \beta_u \leq \beta_u^{max}, \forall u$$

where the bounds may be numbers in the range [0, 1].

In some embodiments, the one or more KPI models may include at least one of the following: number of trips model (corresponding to a total number of trips KPI), trip conversion model (corresponding to request-to-trip conversion rate KPI), gross profit model (corresponding profit KPI), GMV model (corresponding to GMV KPI), another suitable model, or any combination thereof. In some embodiments, each of these models may be constructed based at least partially on one or more machine learning models trained based on historical data 310. These machine learning models may be the building blocks for constructing the KPI models.

In some embodiments, the machine learning models may include a trip conversion probability prediction model 320, a carpool matching probability prediction model 330, another suitable machine learning model, or any combination thereof. For example, the trip conversion probability prediction model 320 may be trained to generate a probability of a rider's carpool request converting to a trip based at least on the pair of price adjustment multipliers applied to the carpool request, where the pair of price adjustment multipliers correspond to the spatial-temporal pricing unit to which the carpool request belongs. In some embodiments, when predicting the probability of the rider's carpool request converting to a trip, the trip conversion probability prediction model 320 may also consider other factors, such as the rider-expected carpool matching probability, which may be determined based on the rider's historical carpool requests.

In some embodiments, the trip conversion probability prediction model 320 may be used to construct various KPI models to be aggregated into the optimization problem 340. For example, the trip conversion probability prediction model 320 may be used to construct a trip conversion probability KPI model.

As another example, a gross profit KPI model may be constructed based on the trip conversion probability prediction model 320. In some embodiments, the gross profit (also called net income, or net inflow) generated from a trip request may be represented as profit=(E[rider_fare]−driver_fare−coupon)*trip_conversion_probability, where trip_conversion_probability may be obtained based on the trip conversion probability prediction model 320, and driver_fare may be predicted by some machine learning models (e.g., by a machine learning model that takes carpool matching, estimated travel time, and estimated travel distance into account, or simply by rider_fare*(1−take_rate), where take_rate may be determined by the ridesharing platform through various algorithms or simple rules. As such, the key part for determining the gross profit of the trip request points to the E[rider_fare], which refers to the expected price (an expected price being charged against the rider) for the trip request, i.e., an expectation of rider_fare determined based on original_price*price_adjustment_multiplier+addtional_term. The original_price may be determined based on the estimated time and distance of the trip request (e.g., by multiplying with certain billing rates to the estimated time and distance respectively). The addtional_term may refer to various fees, tolls, or taxes. In some embodiments, since a carpool request may or may not get matched, the expectation of the rider_fare needs to be estimated based on a carpool matching probability denoted as m. That is, E[rider_f are]= original_price·($\alpha_u m_o + \beta_u (1-m_o)$)+additional_term, where u refers to the pricing unit u, o refers to the carpool request/order, $\alpha_u$ and $\beta_u$ may refer to the carpool dual-pricing multipliers corresponding to the request being matched and not being matched, respectively, $m_o$ refers to a platform-expected carpool matching probability (an objective carpool matching probability) of the carpool request o, and correspondingly, the complement of the carpool matching probability $1-m_o$ refers to a platform-expected probability that the trip request will not get matched. In some embodiments, to predict the value of $m_o$, the carpool matching probability prediction model 330 may be trained based on the historical data 310 and the trained trip conversion probability prediction model 320.

In some embodiments, for the carpool request o in a pricing unit u, the corresponding platform-expected carpool matching probability $m_o$ may be obtained by determining an expected trip count by the trip conversion probability prediction model 420 based on all pending carpool requests in the pricing unit u and the pair of price adjustment multipliers applied to the pricing unit u; and generating the carpool matching probability $m_o$ (the platform-expected carpool matching probability) of the carpool request o based on the expected trip count and the carpool matching probability prediction model 430. The carpool matching probability $m_o$ may then be used to determine the expected value E[rider_fare] of the carpool request o for the ridesharing platform. This expected value E[rider_fare] may also be referred to as a value of the carpool request o for the gross profit KPI model. This process may be repeated for a plurality of carpool requests in the pricing unit u to determine the corresponding KPI values. These KPI values may be aggregated to determine the value of the gross profit KPI model as one of the steps for solving the optimization problem (the optimization model 340 in FIG. 3). In some embodiments, since the gross profit KPI model includes an aggregated result of E[rider_fare]=original_price·($\alpha_u m_o + \beta_u (1-m_o)$)+ additional_term for a plurality of carpool requests, the construction of the pross profit KPI model may be described as: constructing the gross profit KPI model based on the plurality of carpool matching probabilities (the plurality of $m_o$'s) and the pair price adjustment multipliers ($\alpha_u$ and $\beta_u$).

It may be noted that, in some embodiments, the platform-expected (objective) carpool matching probability is used differently from the rider-expected (subjective) carpool matching probability: the objective carpool matching probability is one of the factors for determining price-related KPI values, and the subjective carpool matching probability is one of the factors for determining request-to-trip conversion probabilities (e.g., how likely a carpool request will be converted into a trip). At the same time, they are also causally related as the objective carpool matching probabilities are estimated based on the request-to-trip conversion probabilities, which are in turn determined based on the objective carpool matching probabilities.

As yet another example, the GMV of the trip request may be determined by E[rider_fare]·trip_conversion_probability, where E[rider_fare] may be obtained in the same way as described above (e.g., based on the carpool matching probability prediction model 330 and the trained trip conversion probability prediction model 320), and the trip_conversion_probability may be directly determined by the trained trip conversion probability prediction model 320. In some embodiments, both the carpool matching probability prediction model 330 and the trip conversion probability prediction model 320 may be trained based on historical data 310. In some embodiments, the trip conversion probability prediction model 320 may be trained first, and then be used to train the carpool matching probability prediction model 330. Exemplary details for training each of these machine learning models are described in FIG. 4.

In some embodiments, the optimization problem 340 may be solved to obtain optimal values of the plurality of pairs of price adjustment multipliers. These multipliers may be deployed in ridesharing platforms for determining dual-prices for carpool requests. For example, after receiving a carpool request, the dual-prices may be determined by: determining, based on a plurality of features of the carpool request, a pricing unit to which the carpool request belongs; and determining, based on the optimal values of the pair of price adjustment multipliers corresponding to the determined pricing unit, a carpool-matched price and a carpool-not-matched price for the carpool request. The carpool-matched price is applied to the carpool request when the carpool request is matched with another carpool request, and the carpool-not-matched price is applied to the carpool request when the carpool request fails to be matched.

Figure 4:
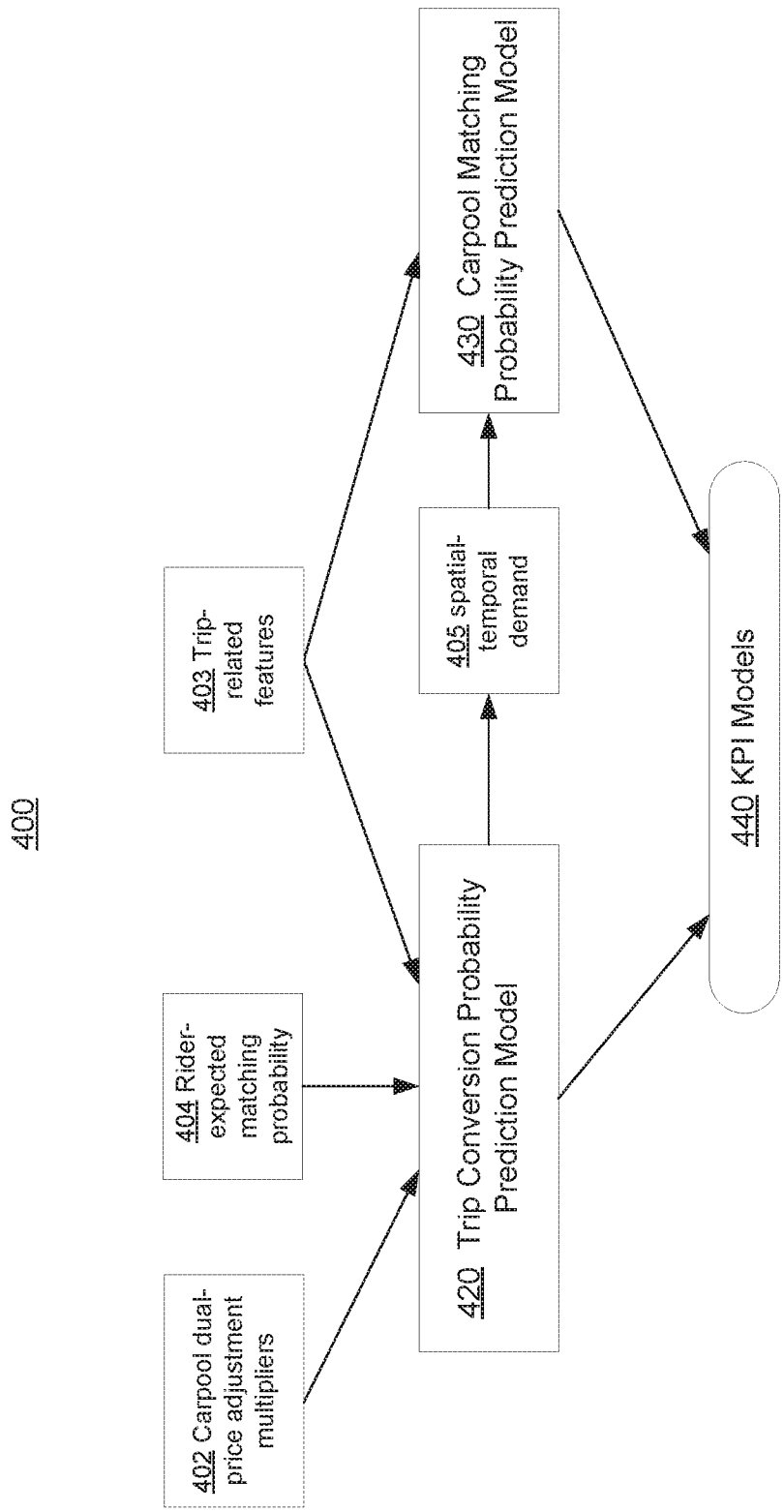
FIG. 4 illustrates an exemplary diagram for training machine learning models, in accordance with various embodiments.

FIG. 4 illustrates an exemplary diagram for training machine learning models, in accordance with various embodiments. These machine learning models may be trained in order to construct various KPI models 440, which then may be used to construct an optimization problem such as the one defined in formula (1). Solving the constructed optimization problem may provide optimal values of decision variables, i.e., price adjustment multipliers for carpool dual-pricing in a plurality of spatial-temporal pricing units. These price adjustment multipliers may be deployed in a ridesharing platform to determine prices for carpool trips or carpool requests. FIG. 4 shows the training process of a trip conversion probability prediction model 420 and the training process of a carpool matching probability prediction model 430.

In some embodiments, the trip conversion probability prediction model 420 may be trained as a classification-type machine learning model to predict a request-to-trip conversion probability. Here, the "request" may refer to an interaction between a rider and the ridesharing platform, such as opening an application of the ridesharing platform, inputting information of a trip request, receiving estimations on the application, or another suitable form of interaction. In some embodiments, the trip conversion probability prediction model 420 may be trained based on a plurality of historical trips.

In some embodiments, in order to collect the plurality of trips as training data to train the machine learning models such as 420 and 430, dual-pricing wiggling may be applied when serving carpool requests. The dual-pricing wiggling refers to a way to set up random price perturbation experiments for exploration purposes. For example, one or more of the plurality of historical carpool requests in the training data may include randomly assigned price adjustment multipliers to realize the dual-pricing wiggling. The resultant training data may explore a large pricing range so that the trained models may make more accurate predictions along price elasticity curves. In some embodiments, the dual-pricing wiggling for carpool dual-pricing may be configured by the following method: setting up ranges and granularities respectively for a (multipliers applied to matched carpool requests) and β (multipliers applied to unmatched carpool requests), where the ranges and granularities may be used to determine a plurality of wiggling levels for each of the price adjustment multipliers; and mapping a carpool request to one of the wiggling levels based on hashing of the origin, destination, and time of the carpool request, where each of the wiggling levels corresponds to a pair of random carpool-matched price adjustment multiplier and random carpool-unmatched price adjustment multiplier.

In some embodiments, each of the plurality of historical trips may include various features, including the carpool dual-pricing adjustment multipliers 402 applied to the historical trip (e.g., one price adjustment multiplier α for matched carpools and one price adjustment multiplier β for unmatched carpool), a plurality of spatial-temporal features associated with the historical trip, a plurality of trip-related features 403 of the historical trip, price features, rider-expected carpool matching probability 404, coupons or other forms of discounts, circumstantial features (e.g., events, holidays, weather, traffic information), rider's features, other suitable features, or any combination thereof. In some embodiments, the plurality of spatial-temporal features associated with the historical trip may include spatial clusters corresponding to the origin and/or destination of the historical trip, and time buckets of the origin and/or destination. In some embodiments, these spatial clusters and time buckets may be smaller than the ones for determining pricing units. In some embodiments, the trip-related features 403 may include platform-estimated trip distance, trip duration, pickup distance, pickup time, etc. In some embodiments, the price features of the historical trip may refer to another form of the carpool dual-price adjustment multipliers 402 applied to the historical trip. For example, the price for a matched carpool price is determined by applying the corresponding price adjustment multiplier α to the original price (e.g., a platform-estimated price for a corresponding solo trip), and may be used as a feature for training the trip conversion probability prediction model 420. In some embodiments, the rider-expected carpool matching probability 404 may be determined based on the rider's carpool requests over a certain historical period in the spatial-temporal pricing unit to which the historical trip belongs. Accordingly, the rider-expected carpool matching probability 404 may also be called a subjective carpool matching probability (e.g., from the rider's point of view). For example, the rider-expected carpool matching probability 404 may refer to the percentage of the rider's historical carpool requests that were matched. If the rider's carpool requests over a certain historical period in the specific spatial-temporal pricing unit are insufficient, the rider-expected carpool matching probability 404 may be determined based on the rider's carpools across multiple pricing units, or the carpools of all the riders in the specific spatial-temporal pricing unit.

In some embodiments, the above-listed features may be pre-processed first before being used in the training process of the trip conversion probability prediction model 420. For example, assuming the price adjustment multiplier for matched carpool requests is denoted as α, the price adjustment multiplier for unmatched carpool requests is denoted as β, and the rider-expected carpool matching probability 404 is denoted as $\tilde{m}$, these three features may be aggregated and pre-processed (transformed) into an expected price adjustment multiplier, i.e., $\gamma=\tilde{m}\alpha+(1-\tilde{m})\beta$, as one single feature for training the trip conversion probability prediction model 420. That is, the trip conversion probability prediction model 420 may be represented as $D=D(\gamma, \vec{x})$, where $\vec{x}$ represents the above-listed features except for the α, β, $\tilde{m}$ included in γ.

In some embodiments, the above-listed features may be directly used in the training process of the trip conversion probability prediction model 420. Using the same denotations as above, the trip conversion probability prediction model 420 may be represented as $D=D(\alpha, \beta, \tilde{m}, \vec{m})$. In some embodiments, the trip conversion probability prediction model 420 may be trained as one of the following models: a Logistic Regression (LR) model, a Random Forest (RF) model, a Deep Neural Network (DNN) model, or another suitable model.

In some embodiments, the carpool matching probability prediction model 430 may be trained to predict a carpool matching probability of a carpool request based on some trip features of the carpool request, spatial-temporal demand features of one or more pricing units associated with the carpool request, other suitable factors, or any combination thereof. In some embodiments, the carpool matching probability prediction model 430 may be constructed based on historical estimations over a certain period. For example, the carpool matching probability for spatial-temporal pricing unit u may be estimated as $$\frac{a_u}{b_u},$$

where $b_u$ refers to a number of total trips in the pricing unit u, and $a_u$ is the number of trips among $b_u$ that are matched. In some embodiments, the matched trip may belong to another spatial-temporal pricing unit u'. That is, the carpool request belonging to the pricing unit u may be matched with another carpool request belonging to the pricing unit u'.

In some embodiments, the carpool matching probability prediction model 430 may be trained based on various features extracted from a plurality of historical carpool requests. The features that may affect carpool matching probability include trip-related features 403, and spatial-temporal demand 405 (e.g., how many riders are requesting in a spatial-temporal pricing unit) in the pricing units associated with the carpool requests. In some embodiments, the pricing units associated with a carpool request may include not only the pricing units to which the carpool request belongs, but also one or more adjacent or neighboring pricing units that may provide additional carpool matching candidates to the carpool request. Here, the "adjacency" may be defined in terms of space and time. For example, for a carpool request in a spatial-temporal pricing unit u, a spatial-temporal pricing unit u', of which the spatial part is close to the spatial part of u, and the temporal part is the same as the temporal part of u, may be determined as an adjacent pricing unit. For a historical carpool trip in a pricing unit u, the spatial-temporal demand 405 in the pricing unit u and/or one or more neighboring pricing units u' may directly affect the matching probability of the historical carpool trip. For example, a higher demand (more riders) usually means a higher chance of being matched.

In some embodiments, the spatial-temporal demand 405 in each pricing unit may be determined by the trained trip conversion probability prediction model 420. For example, the spatial-temporal demand 405 in a pricing unit u may be quantified based on a predicted number of trips in the pricing unit u, which may be determined based on a total number of requests in pricing unit u and the trained trip conversion probability prediction model 420 to predict how many of the requests will convert to trips. The predicted number of trips may be denoted as $\overline{D}_u = \Sigma_{o \in u} D(\alpha_u, \beta_u, \tilde{m}_o, \vec{x}_o), \forall u$, where $o \in u$ means for all carpool requests in the pricing unit u, D refers to the trained trip conversion probability prediction model 420, $\alpha_u$ and $\beta_u$ refer to the pair of price adjustment multipliers applied to the pricing unit u for carpool dual-pricing, $\tilde{m}_o$ refers to the rider-expected carpool matching probability of carpool request o, and $\vec{x}_o$ refers to other features of carpool request o. In some embodiments, $\vec{x}_o$ may include at least one of: spatial features of the carpool request o, temporal features of the carpool request o, point of interest associated with the carpool request o, estimated trip duration, or estimated trip distance.

In some embodiments, the trained carpool matching probability prediction model 430 may be deployed to receive a carpool request associated with a first pricing unit (e.g., to which the carpool request belongs) and a second pricing unit (e.g., one or more adjacent/neighboring pricing units); determine a first expected trip count by applying the trained trip conversion probability prediction model 420 to all carpool requests in the first pricing unit; determine a second expected trip count by applying the trained trip conversion probability prediction model 420 to all carpool requests in the second pricing unit; and determine, by the trained carpool matching probability prediction model 430, a carpool matching probability of the carpool request based on the first expected trip count, the second expected trip count, and a plurality of features of the carpool request (e.g., trip-related features 403).

In some embodiments, the trained carpool matching probability prediction model 430 may be used to construct one or more KPI models that are related to a number of trips, such as a GMV model or a gross profit model.

FIG. 5 illustrates an exemplary method 500 for determining optimal price multipliers for carpool dual-pricing in accordance with various embodiments. The method 500 may be implemented in an environment shown in FIG. 1. The method 500 may be performed by a device, apparatus, or system illustrated by FIGS. 1-4, such as system 102. Depending on the implementation, the method 500 may include additional, fewer, or alternative steps performed in various orders or parallel.

Block 510 includes obtaining a machine-learning model trained to generate a probability for a carpool request from a rider to convert to a trip based at least on a pair of price adjustment multipliers applied to the carpool request. The pair of price adjustment multipliers may be corresponding to a pricing unit to which the carpool request belongs, and are applicable to carpool requests in the pricing unit. In some embodiments, the machine-learning model generates the probability based further on: a rider-expected carpool matching probability of the rider's carpool request, and the rider-expected carpool matching probability may be determined based on historical carpool requests of the rider.

In some embodiments, the machine learning model may be trained by: obtaining training data from a plurality of historical carpool requests from a plurality of pricing units; and training a machine-learning classifier based on the training data. The training data comprises, for each historical carpool request, a pair of historical price adjustment multipliers applied to the historical carpool request, a rider-expected carpool matching probability of the historical carpool request, and a label indicating whether the historical carpool request was converted to a historical trip. The machine learning model is trained to receive input comprising a pair of price adjustment multipliers applied to a given carpool request of a given rider and the rider-expected carpool matching probability of the given rider, and generate output comprising a probability for the given carpool request to convert to a trip. In some embodiments, the historical carpool request further comprises at least one of the following features: spatial and temporal features of the historical carpool request; estimated trip-related attributes of the historical carpool request; or rider features extracted from a rider of the historical carpool request. In some embodiments, one or more of the plurality of historical carpool requests each comprises a pair of randomly assigned price adjustment multipliers. In some embodiments, the machine-learning model is one of: Logistic Regression model, Random Forest (RF) model, or Deep Neural Network (DNN) model.

Block 520 include determining one or more Key Performance Indicator (KPI) models based on the machine-learning model. Each of the KPI models comprises a plurality of pairs of price adjustment multipliers as parameters corresponding to a plurality of pricing units. In some embodiments, the one or more KPI models comprise at least one of: a trip conversion rate model, a gross profit model, or a gross merchandise value (GMV) model. In some embodiments, the determining the one or more KPI models based on the machine-learning model comprises: training a carpool matching probability prediction model that predicts a carpool matching probability for a carpool request based on the machine-learning model, a plurality of features of the carpool request, and a total count of trips in the pricing unit to which the carpool request belongs; and determining the one or more KPI models based on the machine learning model and the carpool matching probability prediction model.

In some embodiments, the carpool matching probability prediction model may be used to estimate a carpool matching probability for a given carpool request from a pricing unit. The estimation process may include: receiving a plurality of carpool requests in the pricing unit, the pricing unit corresponding to a pair of price adjustment multipliers for determining prices for carpool requests in the pricing unit; determining an expected trip count by the machine-learning model based on the plurality of carpool requests in the pricing unit and the pair of price adjustment multipliers; and generating the carpool matching probability of the carpool request by the carpool matching probability prediction model based on the first expected trip count, wherein the carpool matching probability prediction model is trained based on a plurality of historical carpool requests to predict a probability for a carpool request to get matched.

Block 530 includes constructing an optimization problem based on the KPI models. The optimization problem comprises the plurality of pairs of price adjustment multipliers as decision variables. In some embodiments, one or more boundary constraints of the plurality of pairs of price adjustment multipliers. In some embodiments, the pair of price adjustment multipliers comprises a first multiplier determining a carpool-matched price and a second multiplier determining a carpool-not-matched price, and the first multiplier is required to be less than the second multiplier.

Block 540 includes determining optimal values of the plurality of pairs of price adjustment multipliers for the plurality of pricing units by solving the optimization problem based on a plurality of historical carpool requests.

In some embodiments, the method 500 may further comprise: determining, based on a plurality of features of a carpool request, a pricing unit to which the carpool request belongs; and determining, based on the optimal values of the pair of price adjustment multipliers corresponding to the determined pricing unit, a carpool-matched price and a carpool-not-matched price for the carpool request.

Figure 6:
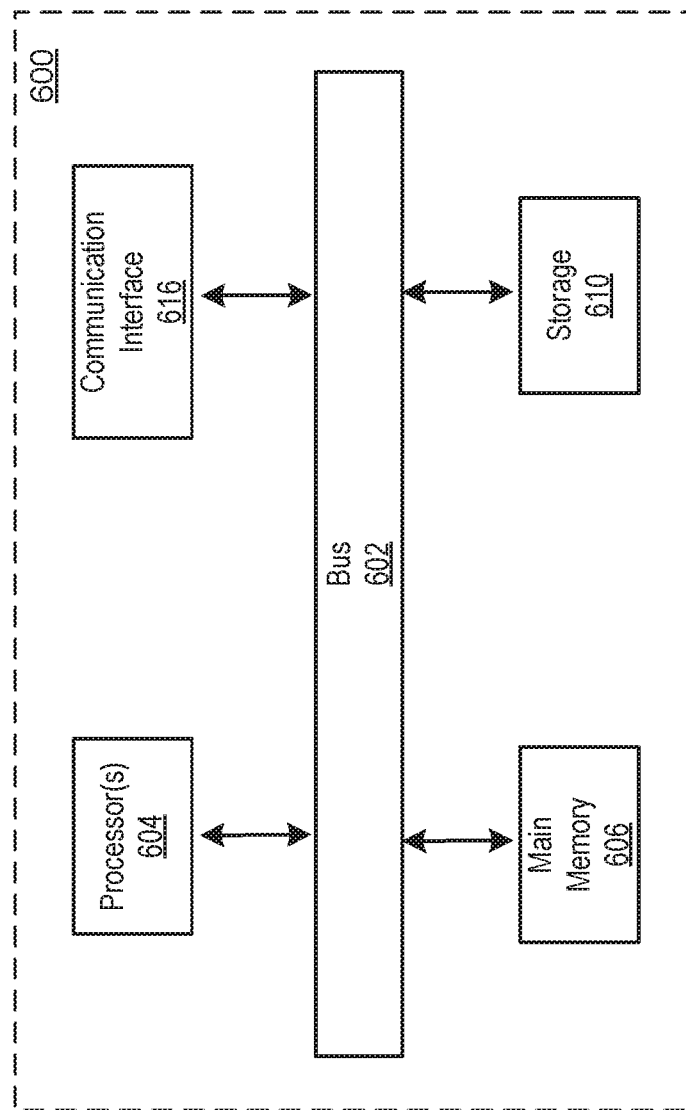
FIG. 6 is a block diagram that illustrates a computer system upon which any of the embodiments described herein may be implemented.

FIG. 6 illustrates an example computing device in which any of the embodiments described herein may be implemented. The computing device may be used to implement one or more components of the systems and the methods shown in FIGS. 1-7. The computing device 600 may comprise a bus 602 or other communication mechanism for communicating information and one or more hardware processors 604 coupled with bus 602 for processing information. Hardware processor(s) 604 may be, for example, one or more general-purpose microprocessors.

The computing device 600 may also include a main memory 606, such as a random-access memory (RAM), cache and/or other dynamic storage devices 610, coupled to bus 602 for storing information and instructions to be executed by processor(s) 604. Main memory 606 also may be used for storing temporary variables or other intermediate information during execution of instructions to be executed by processor(s) 604. Such instructions, when stored in storage media accessible to the processor(s) 604, may render computing device 600 into a special-purpose machine that is customized to perform the operations specified in the instructions. Main memory 606 may include non-volatile media and/or volatile media. Non-volatile media may include, for example, optical or magnetic disks. Volatile media may include dynamic memory. Common forms of media may include, for example, a floppy disk, a flexible disk, hard disk, solid-state drive, magnetic tape, or any other magnetic data storage medium, a CD-ROM, any other optical data storage medium, any physical medium with patterns of holes, a RAM, a DRAM, a PROM, an EPROM, a FLASH-EPROM, NVRAM, any other memory chip or cartridge, or networked versions of the same.

The computing device 600 may implement the techniques described herein using customized hard-wired logic, one or more ASICs or FPGAs, firmware, and/or program logic which in combination with the computing device may cause or program computing device 600 to be a special-purpose machine. According to one embodiment, the techniques herein are performed by computing device 600 in response to processor(s) 604 executing one or more sequences of one or more instructions contained in main memory 606. Such instructions may be read into main memory 606 from another storage medium, such as storage device 610. Execution of the sequences of instructions contained in main memory 606 may cause processor(s) 604 to perform the process steps described herein. For example, the processes/methods disclosed herein may be implemented by computer program instructions stored in main memory 606. When these instructions are executed by processor(s) 604, they may perform the steps as shown in corresponding figures and described above. In alternative embodiments, hard-wired circuitry may be used in place of or in combination with software instructions.

The computing device 600 also includes a communication interface 616 coupled to bus 602. Communication interface 616 may provide a two-way data communication coupling to one or more network links that are connected to one or more networks. As another example, communication interface 616 may be a local area network (LAN) card to provide a data communication connection to a compatible LAN (or WAN component to communicate with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

When the functions disclosed herein are implemented in the form of software functional units and sold or used as independent products, they can be stored in a processor executable non-volatile computer readable storage medium. Particular technical solutions disclosed herein (in whole or in part) or aspects that contribute to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform. The terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The invention claimed is:

1. A computer-implemented method, the method comprising:
obtaining historical data based on a plurality of historical carpool requests from a plurality of spatial-temporal units, wherein the historical data comprises, for each historical carpool request, a pair of historical price adjustment multipliers applied to the historical carpool request, a rider-expected carpool matching probability of the historical carpool request, and a label indicating whether the historical carpool request was converted to a historical trip;
training a first machine-learning model configured to generate a probability for a given carpool request from a rider to convert to a trip based at least on a pair of price adjustment multipliers, wherein the first machine-learning model comprises a machine-learning classifier, and wherein the pair of price adjustment multipliers correspond to a spatial-temporal unit to which the given carpool request belongs;
training a second machine-learning model configured to predict a carpool matching probability for the given carpool request based on the trained first machine-learning model, a plurality of features of the given carpool request, and a total count of trips in the spatial-temporal unit to which the given carpool request belongs;
determining one or more Key Performance Indicator (KPI) models based on the trained first machine-learning model and the trained second machine-learning model, wherein each of the KPI models comprises a plurality of pairs of price adjustment multipliers as parameters corresponding to the plurality of spatial-temporal units;
constructing an optimization model based on the KPI models, wherein the optimization model comprises the plurality of pairs of price adjustment multipliers as decision variables; and
determining optimal values of the plurality of pairs of price adjustment multipliers for the plurality of spatial-temporal units by solving the optimization model.

2. The method of claim 1, further comprising:
determining, based on a plurality of features of a carpool request, a spatial-temporal unit to which the carpool request belongs;
determining, based on the optimal values of the pair of price adjustment multipliers corresponding to the determined spatial-temporal unit, a carpool-matched price and a carpool-not-matched price for the carpool request; and
applying the carpool-matched price to the carpool request when the carpool request is matched with another carpool request, or applying the carpool-not-matched price to the carpool request when the carpool request fails to be matched.

3. The method of claim 1, wherein the trained first machine-learning model is configured to generate the probability for the given carpool request to convert to the trip based further on:
a rider-expected carpool matching probability of the rider's carpool request, wherein the rider-expected carpool matching probability is determined based on historical carpool requests of the rider.

4. The method of claim 1, wherein the historical carpool request further comprises at least one of the following:
spatial and temporal features of the historical carpool request;
estimated trip-related attributes of the historical carpool request; and
rider features extracted from a rider of the historical carpool request.

5. The method of claim 1, wherein one or more of the plurality of historical carpool requests each comprise a pair of randomly assigned price adjustment multipliers.

6. The method of claim 1, wherein the one or more KPI models comprise at least one of the following: a trip conversion rate model, a gross profit model, and a gross merchandise value (GMV) model.

7. The method of claim 1, wherein the first machine-learning model is one of the following: Logistic Regression model, Random Forest (RF) model, and Deep Neural Network (DNN) model.

8. The method of claim 1, wherein the second machine-learning model comprises:
a carpool matching probability prediction model.

9. The method of claim 1, wherein the optimization model further comprises:
one or more boundary constraints of the plurality of pairs of price adjustment multipliers.

10. The method of claim 1, wherein the pair of price adjustment multipliers comprises a first multiplier determining a carpool-matched price and a second multiplier determining a carpool-not-matched price, wherein the first multiplier is less than the second multiplier.

11. A system comprising one or more processors and one or more non-transitory computer-readable memories coupled to the one or more processors, the one or more non-transitory computer-readable memories storing instructions that, when executed by the one or more processors, cause the system to perform operations comprising:
obtaining historical data based on a plurality of historical carpool requests from a plurality of spatial-temporal units, wherein the historical data comprises, for each historical carpool request, a pair of historical price adjustment multipliers applied to the historical carpool request, a rider-expected carpool matching probability of the historical carpool request, and a label indicating whether the historical carpool request was converted to a historical trip;
training a first machine-learning model configured to generate a probability for a given carpool request from a rider to convert to a trip based at least on a pair of price adjustment multipliers, wherein the first machine-learning model comprises a machine-learning classifier, and wherein the pair of price adjustment multipliers correspond to a spatial-temporal unit to which the given carpool request belongs;
training a second machine-learning model configured to predict a carpool matching probability for the given carpool request based on the trained first machine-learning model, a plurality of features of the given carpool request, and a total count of trips in the spatial-temporal unit to which the given carpool request belongs;
determining one or more Key Performance Indicator (KPI) models based on the trained first machine-learning model and the trained second machine-learning model, wherein each of the KPI models comprises a plurality of pairs of price adjustment multipliers as parameters corresponding to the plurality of spatial-temporal units;

constructing an optimization model based on the KPI models, wherein the optimization model comprises the plurality of pairs of price adjustment multipliers as decision variables; and determining optimal values of the plurality of pairs of price adjustment multipliers for the plurality of spatial-temporal units by solving the optimization model.

12. The system of claim 11, wherein the operations further comprise:

determining, based on a plurality of features of a carpool request, a spatial-temporal unit to which the carpool request belongs;

determining, based on the optimal values of the pair of price adjustment multipliers corresponding to the determined spatial-temporal unit, a carpool-matched price and a carpool-not-matched price for the carpool request; and applying the carpool-matched price to the carpool request when the carpool request is matched with another carpool request, or applying the carpool-not-matched price to the carpool request when the carpool request fails to be matched.

13. The system of claim 11, wherein the historical carpool request further comprises at least one of the following:

spatial and temporal features of the historical carpool request;

estimated trip-related attributes of the historical carpool request; and rider features extracted from a rider of the historical carpool request.

14. The system of claim 11, wherein the second machine-learning model comprises:

a carpool matching probability prediction model.

15. A non-transitory computer-readable storage medium storing instructions that, when executed by one or more processors, cause the one or more processors to perform operations comprising:

obtaining historical data based on a plurality of historical carpool requests from a plurality of spatial-temporal units, wherein the historical data comprises, for each historical carpool request, a pair of historical price adjustment multipliers applied to the historical carpool request, a rider-expected carpool matching probability of the historical carpool request, and a label indicating whether the historical carpool request was converted to a historical trip;

training a first machine-learning model configured to generate a probability for a given carpool request from a rider to convert to a trip based at least on a pair of price adjustment multipliers, wherein the first machine-learning model comprises a machine-learning classifier, and wherein the pair of price adjustment multipliers correspond to a spatial-temporal unit to which the given carpool request belongs;

training a second machine-learning model configured to predict a carpool matching probability for the given carpool request based on the trained first machine-learning model, a plurality of features of the given carpool request, and a total count of trips in the spatial-temporal unit to which the given carpool request belongs;

determining one or more Key Performance Indicator (KPI) models based on the trained first machine-learning model and the trained second machine-learning model, wherein each of the KPI models comprises a plurality of pairs of price adjustment multipliers as parameters corresponding to the plurality of spatial-temporal units;

constructing an optimization model based on the KPI models, wherein the optimization model comprises the plurality of pairs of price adjustment multipliers as decision variables; and determining optimal values of the plurality of pairs of price adjustment multipliers for the plurality of spatial-temporal units by solving the optimization model.

16. The non-transitory computer-readable storage medium of claim 15, wherein the operations further comprise:

determining, based on a plurality of features of a carpool request, a spatial-temporal unit to which the carpool request belongs;

determining, based on the optimal values of the pair of price adjustment multipliers corresponding to the determined spatial-temporal unit, a carpool-matched price and a carpool-not-matched price for the carpool request; and applying the carpool-matched price to the carpool request when the carpool request is matched with another carpool request, or applying the carpool-not-matched price to the carpool request when the carpool request fails to be matched.

17. The non-transitory computer-readable storage medium of claim 15, wherein the historical carpool request further comprises at least one of the following:

spatial and temporal features of the historical carpool request;

estimated trip-related attributes of the historical carpool request; and rider features extracted from a rider of the historical carpool request.

* * * * *